(12) United States Patent
Iwasaki

(10) Patent No.: US 6,643,100 B2
(45) Date of Patent: Nov. 4, 2003

(54) MAGNETIC HEAD HAVING A CHAMFER THEREOF ORIENTED TOWARD MEDIUM AND METHOD FOR MANUFACTURING THE SAME

(75) Inventor: Jun Iwasaki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 112 days.

(21) Appl. No.: 09/934,210

(22) Filed: Aug. 21, 2001

(65) Prior Publication Data

US 2002/0030936 A1 Mar. 14, 2002

(30) Foreign Application Priority Data

Aug. 30, 2000 (JP) .......................... 2000-261029

(51) Int. Cl.<sup>7</sup> ................................. G11B 5/60
(52) U.S. Cl. ................. 360/236.5; 360/235.7; 360/236.4
(58) Field of Search .......... 360/235.6, 235.7, 360/236.4, 236.5

(56) References Cited

U.S. PATENT DOCUMENTS

| 4,673,996 A | * | 6/1987 | White ...................... 360/236.7 |
| 5,267,108 A | * | 11/1993 | Tani ........................ 360/236.4 |
| 5,516,323 A | | 5/1996 | Carlson et al. |
| 5,548,886 A | | 8/1996 | Kojima et al. |
| 5,663,853 A | * | 9/1997 | Park ........................ 360/236.4 |
| 5,748,407 A | * | 5/1998 | Schaenzer et al. ....... 360/236.5 |
| 5,959,805 A | * | 9/1999 | Kawasaki et al. ....... 360/236.4 |
| 6,040,959 A | | 3/2000 | Kobayashi et al. |

FOREIGN PATENT DOCUMENTS

| JP | 8-21171 | 3/1996 |
| JP | 2948598 | 7/1999 |
| JP | 11-219574 | 8/1999 |

* cited by examiner

*Primary Examiner*—Robert S. Tupper
(74) *Attorney, Agent, or Firm*—Brinks Hofer Gilson & Lione

(57) ABSTRACT

An angle θ1 made between a supporting surface S of a slider and an imaginary plane C in which a first border line and a second border line of a tapered surface lie, and an angle θ2 made between the supporting surface S of the slider and an imaginary plane D in which a first border line and a second border line of a tapered surface lie, respectively fall within a range of not less than 5 degrees but not more than 14 degrees.

7 Claims, 10 Drawing Sheets

MAGNETIC HEAD HAVING A CHAMFER THEREOF ORIENTED TOWARD MEDIUM AND METHOD FOR MANUFACTURING THE SAME

BACKGROUND OF THE INVENTION

1. Field of the Invention

The present invention relates to a magnetic head including a slider for use in a hard disk device, and a method for manufacturing the magnetic head and, more particularly, to a magnetic head which incurs less damage in the course of recording and/or reproduction on a recording medium, and to a method for manufacturing the magnetic head.

2. Description of the Related Art

FIG. 17 is a perspective view of a conventional magnetic head for use in a hard disk, with a medium-facing surface looking upwardly.

In this magnetic head, an upstream end A in the direction of motion of a recording medium is referred to as a leading edge and a downstream end B thereof is referred to as a trailing edge.

Referring to FIG. 17, a slider 1 is fabricated of a ceramic material. Thin-film elements 6 for magnetic recording and magnetic reproduction are arranged on the trailing end face B of the slider 1.

An air groove 2 is formed on a medium-facing surface of the slider 1, and an ABS (Air Bearing Surface) surface 3 surrounds the air groove 2. The ABS surface 3 is crown-shaped.

The conventional magnetic head shown in FIG. 17 has edges 1a and 1a on the medium-facing surface of the slider 1. When the magnetic head comes into contact with the recording medium, the recording medium is subject to damage. The edges 1a and 1a of the slider 1 are thus chamfered through a machining process.

The chamfering of the edges 1a and 1a is performed on a plurality of sliders 1 in their unitary body, i.e., a slider bar. FIG. 18 is a partial perspective view showing the slider bar of FIG. 17

As shown in FIG. 18, the trailing end face B of the slider bar 7 has a plurality of thin-film elements 6. The medium-facing surface 8 of the slider bar 7 bears the air groove 2 and the ABS surface 3, and a notch 9 having a predetermined depth is formed between the thin-film elements 6.

FIG. 19 is a front view showing a conventional chamfering process. The entire surface of the air groove 2 and the ABS surface 3 in the slider bar 7 fixed onto a jig 10 are put into contact with a lapping tape R for polishing arranged on a cushioning material K by a certain level of pressure. By sliding the jig 10 in the X direction and/or Y direction, the edges are chamfered.

No consideration has been given to what degree of chamfering is effective in the reduction of damage to the recording medium when the edges are chamfered. When the slider is chamfered using the above-referenced chamfering process, maintaining chamfering accuracy is difficult.

SUMMARY OF THE INVENTION

Accordingly, it is an object of the present invention to provide a magnetic head in which chamfering dimensions of edges of a medium-facing surface of a slider fall within a range which allows the damage of the recording medium to be reduced with the magnetic head coming into contact with the recording medium, and which reduces variations in chamfering performance.

The present invention in one aspect relates to a magnetic head and includes a slider including a medium-facing surface oriented toward a recording medium, a supporting surface serving as a support, a trailing end face and a leading end face, and an element, arranged on the trailing end face of the slider, for magnetically recording and/or magnetically reproducing data, wherein at least one of the trailing edge and the leading edge of the medium-facing surface has a tapered surface or a curved surface having a first border line bordering the medium-facing surface and a second border line bordering one of the trailing end face and the leading end face, and wherein an imaginary plane in which the first border line and the second border line lie makes an angle of not less than 5 degrees but not more than 14 degrees with respect to the supporting surface.

When the tapered surface or the curved surface is formed on at least one of the trailing edge and the leading edge of the medium-facing surface, the imaginary plane in which the first border line and the second border line lie makes an angle of not less than 5 degrees but not more than 14 degrees with respect to the supporting surface. In this arrangement, the occurrence of damage to the recording medium is reduced when the magnetic head comes into contact with the recording medium, and variations in chamfering performance are reduced.

When the angle θ between the supporting surface and the imaginary plane in which the first border line and the second border line lie falls within a range of $5° \leq \theta \leq 8°$, the occurrences of damage when the magnetic head comes into contact with the recording medium are completely prevented.

Preferably, a protective layer is formed on the medium-facing surface.

Preferably, the first border line of the tapered surface or the curved surface formed on the trailing edge is positioned to be closer to the trailing end face than a gap of the element. In this arrangement, the occurrence of damage of the element is avoided.

Preferably, the medium-facing surface includes a step, and the highest surface area of the medium-facing surface is an ABS surface receiving a lift resulting from an air flow on the recording medium, and the gap of the element is located within the region of the ABS surface. In the arrangement, the element is placed closest to the recording medium during recording and reproduction.

The first border line runs along a border between one of the tapered surface and the curved surface and the ABS surface.

Preferably, the first border line of the tapered surface or the curved surface formed on the leading edge is positioned to be closer to the leading end face than a step defining the ABS surface. In this arrangement, lift characteristics of the magnetic head is thus free from the tapered surface or the curved surface.

The first border line may extend in a straight line or a curved line in the transverse direction of the slider.

The present invention in another aspect relates to a method for manufacturing a magnetic head which includes a slider including a medium-facing surface oriented toward a recording medium, a supporting surface serving as a support, a trailing end face and a leading end face, and an element, arranged on the trailing end face of the slider, for magnetically recording and/or magnetically reproducing data. The method includes the steps of (a) producing a slider bar having a plurality of elements on the trailing end face thereof, (b) forming a tapered surface on the edge of the trailing end face by setting the edge of the medium-facing surface of the slider bar on the trailing edge on a polishing surface so that the supporting surface of the slider bar makes an angle not less than 5 degrees but not more than 14 degrees with respect to the polishing surface, and by moving the slider bar reciprocatingly in one direction, and (c) separating the slider bar into individual sliders each having the element thereof.

Preferably, the manufacturing method further includes, subsequent to the tapered surface forming step (b), (d) forming a tapered surface on the edge of the leading end face by setting the edge of the medium-facing surface of the slider bar on the leading edge on a polishing surface so that the supporting surface of the slider bar makes an angle not less than 5 degrees but not more than 14 degrees with respect to the polishing surface, and by moving the slider bar reciprocatingly in one direction.

Since a flat-tapered surface is formed on the slider trailing edge and/or the slider leading edge, controlling variations in the dimensions of the taper such as the angle of the taper and the range of the taper becomes easier.

Preferably, in the step (b) and/or the step (c), the angle between the supporting surface of the slider bar and the polishing surface is set to be an angle not less than 5 degrees but not more than 14 degrees.

When the edges of the slider bar are polished with the angle between the supporting surface of the slider bar and the polishing surface set to be an angle not less than 5 degrees but not more than 14 degrees, an imaginary plane in which the first border line and the second border line lie makes an angle of not less than 5 degrees but not more than 14 degrees with respect to the supporting surface. The first border line runs along the border between the medium-facing surface and the tapered surface formed on the slider trailing edge and/or the slider leading edge, and the second border line runs along the border between the tapered surface and the end face. The occurrences of damage to the recording medium when the magnetic head comes into contact with the recording medium are reduced. Variations in the chamfering process are minimized.

When the slider bar is reciprocatingly moved with the angle between the supporting surface of the slider bar and the polishing surface kept to within a range of not less than 5 degrees to not more than 8 degrees, an imaginary plane in which the first border line and the second border line lie makes an angle of not less than 5 degrees to not more than 8 degrees with respect to the supporting surface. The first border line runs along the border between the medium—medium-facing surface and the tapered surface formed on the slider trailing edge and/or the slider leading edge, and the second border line runs along the border between the tapered surface and the end face. The occurrences of damage to the recording medium when the magnetic head comes into contact with the recording medium are prevented.

When the slider bar is reciprocatingly moved with the angle between the supporting surface of the slider bar and the polishing surface kept to within a range from not less than 5 degrees to not more than 14 degrees, an overall distance of travel of the slider bar in reciprocating motion for forming the tapered surface is reduced. Workability with the slider bar is thus improved.

When the slider bar is reciprocatingly moved with the angle between the supporting surface of the slider bar and the polishing surface kept to within a range from not less than 5 degrees to not more than 8 degrees, workability with the slider is even more improved.

The slider bar may be reciprocatingly moved in a direction parallel to or perpendicular to the longitudinal direction of the slider bar in the step (b) and/or the step (c).

When the slider bar is reciprocatingly moved in a direction parallel to the longitudinal direction of the slider bar, the first border line, running along the border between the medium—medium-facing surface and the tapered surface formed on the trailing edge and/or the leading edge of the finished slider, extends in a straight light or a curved line in the transverse direction. Variations in the dimensions of the tapered surface are controlled.

A protective layer may be formed on the medium-facing surface oriented toward a recording medium bar before the step (b) and/or the step (c).

Since the entire medium-facing surface of the slider is put into contact with the lapping tape in the conventional chamfering process, the protective layer formed on the medium-facing surface is polished together.

In accordance with the present invention, only the trailing edge and/or the leading edge of the slider bar is put into contact with the polishing surface in a polishing operation. The protective layer formed on the medium-facing surface is thus free from polishing, except the edges of the slider.

DESCRIPTION OF THE PREFERRED EMBODIMENTS

Figure 1:
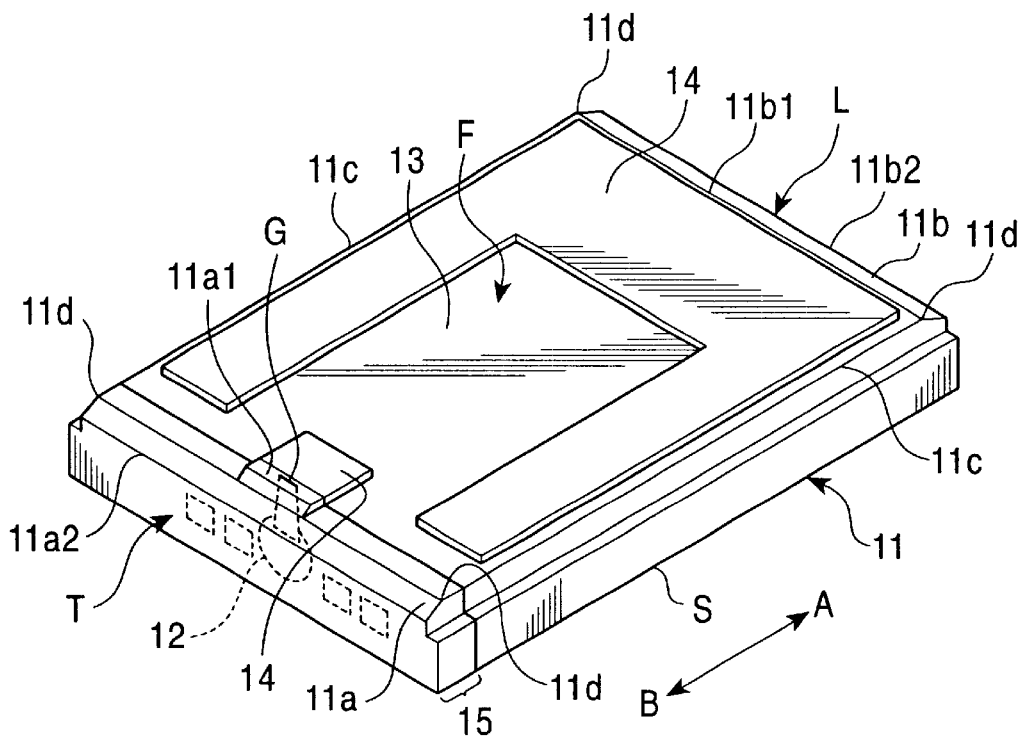
FIG. 1 is a perspective view of a magnetic head in accordance with one embodiment of the present invention.

FIG. 1 is a perspective view of a magnetic head in accordance with one embodiment of the present invention, with the medium-facing surface thereof looking upward.

In this magnetic head, an upstream end A in the direction of motion of a recording medium is referred to as a leading edge and a downstream end B thereof is referred to as a trailing edge.

Figure 4:
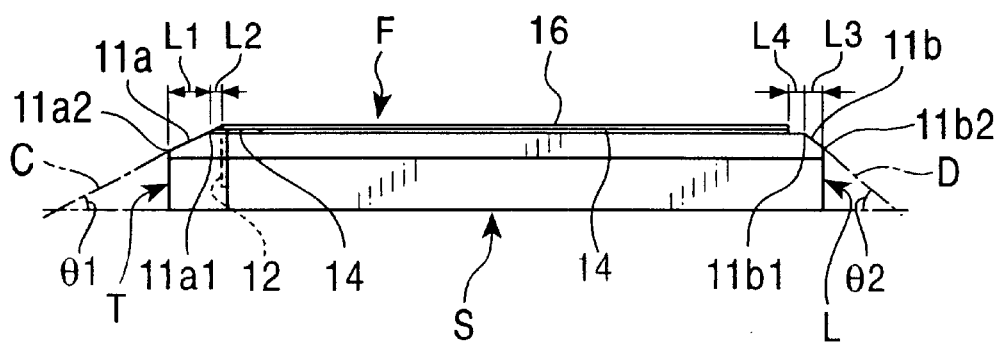
FIG. 4 is a side view of the magnetic head of FIG. 1.

Referring to FIG. 1, a slider 11 is fabricated of a ceramic material. The slider 11 has an alumina layer 15 on the trailing end face T thereof. An element 12 for magnetic recording and/or reproduction is arranged on the alumina layer 15. The element 12 includes a stack of a reproducing section employing a magnetoresistive (MR) effect device and a recording section formed of an inductive thin-film magnetic head. A gap G (the recording section and/or the reproducing section) of the element 12 appears on a medium-facing surface F of the slider 11. In the slider 11 of the magnetic head of this embodiment, a protective layer fabricated of diamond-like carbon (DLC) is formed on the medium-facing surface F. The gap G is thus covered with the protective layer. Referring to FIG. 1, the protective layer is not shown for purposes of clarity. As shown in FIG. 4, the protective layer is shown as a protective layer 16. The surface opposite to the medium-facing surface F is a supporting surface S functioning as a supporting side.

Referring to FIG. 1, a step is formed on the medium-facing surface F facing the recording medium. The highest surface portion of the medium-facing surface F is an ABS (Air Bearing Surface) surface 14 that receives a lift force from air flow on the recording medium. An air groove 13 is surrounded by the ABS surface 14. The height of the step is 1.5 mm.

Figure 2:
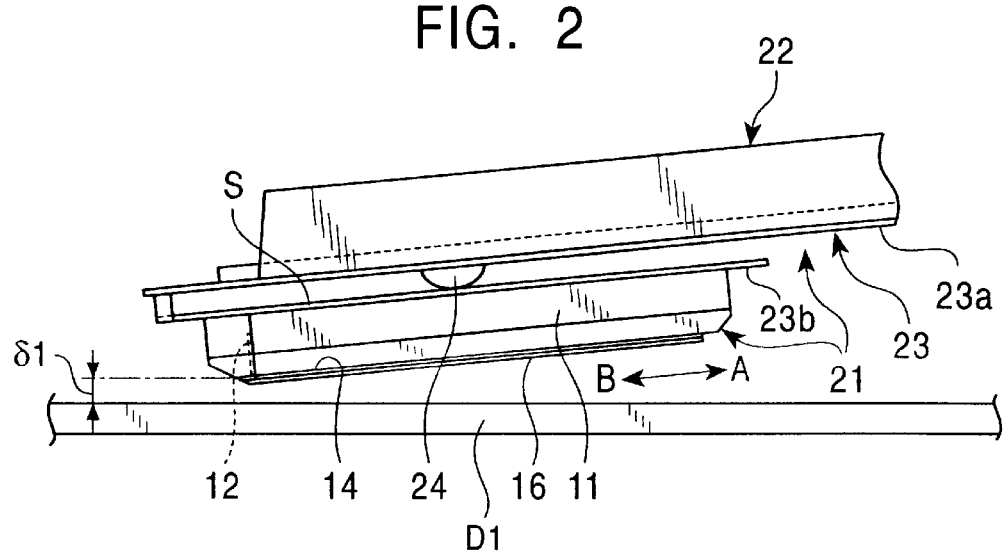
FIG. 2 is a side view showing the magnetic head, of FIG. 1, affixed to a load beam and flying above a recording medium.

Referring to FIG. 2, a support structure 21 for supporting the slider 11 shown in FIG. 1 includes a load beam 22 and a flexure 23. The load beam 22 includes a plate spring fabricated of stainless steel or the like. The load beam 22 in the vicinity of the end thereof further includes a semispherical pivot 24 projecting downward as shown. The slider 11 abuts the pivot 24 through the flexure 23.

The flexure 23 is formed of a thin plate spring of stainless steel. The flexure 23 includes a base portion 23a and a lip 23b. The supporting surface S of the slider 11 is bonded to the underside of the lip 23b serving as a support side of the slider 11.

The top surface of the lip 23b abuts the pivot 24 formed on the load beam 22. The slider 11 bonded to the underside of the lip 23b freely changes the posture thereof on the peak of the pivot 24 through elasticity of the lip 23b.

At the start of a magnetic disk D1 (a recording medium), air flows between the slider 11 and the surface of the magnetic disk D1 in the direction of movement of the disk. Upon receiving a lifting force, the ABS surface 14 of the slider 11 is lifted from the surface of the magnetic disk D1 by a short distance δ1 (spacing).

As shown in FIG. 2, in the flying posture, the leading end A of the slider 11 is positioned to be higher than the trailing end B of the slider 11. In the flying posture, a magnetic signal is detected from the disk through the MR head of the element 12, or a magnetic signal is written through the inductive head.

The slider 11 of the present embodiment shown in FIG. 1 has a tapered surface 11a at the trailing edge of the medium-facing surface F and a tapered surface 11b at the leading end of the medium-facing surface F. The tapered surfaces 11a and 11b are flat.

Figure 3:
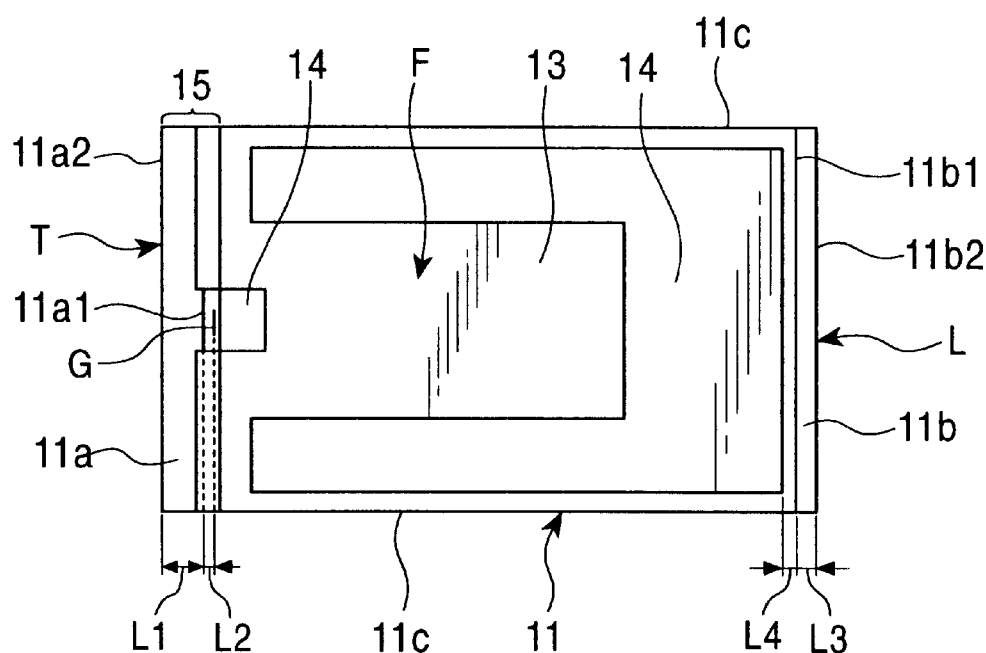
FIG. 3 is a plan view showing the medium-facing surface of the magnetic head of FIG. 1.

FIG. 3 is a plan view showing the medium-facing surface F of the slider 11 shown in FIG. 1, and FIG. 4 is a side view showing the slider 11.

A first border line 11a1 runs along the border between the medium-facing surface F and the tapered surface 11a. A second border line 11a2 runs along the border between the tapered surface 11a and the trailing end face T. In this embodiment, the first border line 11a1 includes the border line with the ABS surface 14 of the tapered surface 11a, and is an angle made between the supporting surface S and an imaginary plane C in which the first border line 11a1 and the second border line 11a2 lie.

A first border line 11b1 runs along the border between the medium-facing surface F and the tapered surface 11b, and a second border line 11b2 runs along the border between the tapered surface 11b and the leading end face L. In this embodiment, θ2 is an angle made between the supporting surface S of the slider 11 and an imaginary plane D in which the first border line 11b1 and the second border line 11b2 lie. Each of θ1 and θ2 falls within a range from not less than 5 degrees to not more than 14 degrees. The angles θ1 and θ2 may or may not equal each other.

Instead of the tapered surfaces 11a and 11b, curved surfaces may be formed on the trailing edge and/or the leading edge of the medium-facing surface F. In this case as well, an angle is made between the supporting surface S of the slider and an imaginary plane in which the first border line of the curved surface with the medium-facing surface F and the second border line of the curved surface with the trailing end face T lie, and an angle is made between the supporting surface S of the slider and an imaginary plane in which the first border line of the curved surface with the medium-facing surface F and the second border line of the curved surface with the leading end face L lie. Each of these angles also falls within a range from not less than 5 degrees to not more than 14 degrees.

With each of the angles θ1 and θ2 within the range from not less than 5 degrees to not more than 14 degrees, the possibility of damage of the magnetic disk D1 is reduced when the slider 11 running in a lifted position over the magnetic disk D1 (the recording medium) as shown in FIG. 2 comes into contact with the magnetic disk D1. With each of the angles θ1 and θ2 within the range from not less than 5 degrees to not more than 8 degrees, damage of the magnetic disk D1 is prevented.

If each of the angles θ1 and θ2 is more than 14 degrees, the edge angle of the slider at the first border line 11a1 of the tapered surface 11a, and the edge angle of the slider at the first border line 11b1 of the tapered surface 11b become closer to a right angle. The possibility of damage of the magnetic disk D1 cannot be reduced when the slider 11 comes into contact with the magnetic disk D1.

If each of the angles θ1 and θ2 is less than 5 degrees, the edge angle of the slider at the second border line 11a2 of the tapered surface 11a and the edge angle of the slider at the second border line 11b2 of the tapered surface 11b become closer to a right angle. The possibility of damage of the magnetic disk D1 cannot be reduced when the slider 11 comes into contact with the magnetic disk D1.

If each of the angles θ1 and θ2 is not less than 5 degrees but not more than 14 degrees, each of the edge angle of the slider at the first border line 11a1 of the tapered surface 11a, the edge angle of the slider at the first border line 11b1 of the tapered surface 11b, the edge angle of the slider at the second border line 11a2 of the tapered surface 11a, and the edge angle of the slider at the second border line 11b2 of the tapered surface 11b becomes obtuse. The possibility of damage of the magnetic disk D1 is reduced when the slider 11 is put into contact with the magnetic disk D1.

When each of the angles θ1 and θ2 is not less than 5 degrees, variations, from product to product, in the distance L1 from the first border line 11a1 of the tapered surface 11a to the trailing end face T and the distance L3 from the first border line 11b1 of the tapered surface 11b to the leading end face L, are controlled to within a permissible range, and the quality of the product is increased.

Referring to FIG. 3, the first border line 11a1 of the tapered surface 11a formed on the trailing edge of the medium-facing surface F is placed closer to the trailing end face T than the gap G of the element 12. The gap G is thus prevented from being damaged. The distance L2 between the first border line 11a1 of the slider 11 to the gap G is 3 to 5 μm, for example.

The gap G is positioned within the area of the ABS surface 14 so that the gap G is closest to the magnetic disk D1 during recording and reproduction. The gap G is covered with a protective layer (not shown in FIG. 3) fabricated of the DLC (diamond-like carbon). It is acceptable that the gap G is exposed to the surface of the ABS surface 14.

It is not a requirement that the gap G be positioned within the area of the ABS surface. The gap G may be flush with the surface of the air groove 13.

Since the first border line 11b1 of the tapered surface 11b is positioned closer to the leading end face L than the step formed of the ABS surface 14, the lift characteristics of the slider 11 are thus prevented from being affected by the tapered surface 11b.

The slider 11 shown from FIG. 1 through FIG. 4 has the tapered surfaces 11a and 11b respectively on the trailing edge and the leading edge of the slider 11, and each of the angles θ1 and θ2 falls within a range from not less than 5 degrees to not more than 14 degrees.

Referring to FIG. 2, the trailing edge of the slider 11 is closer to the magnetic disk D1 in the flying posture thereof. As a result, the trailing edge is more likely to touch the magnetic disk D1 than the leading edge. In other words, if only the tapered surface 11a at the trailing edge is formed with no leading end tapered surface produced, the possibility of damage of the magnetic disk D1 due to the touch of the slider 11 to the magnetic disk D1 is reduced. When the tapered surfaces 11a and 11b are respectively formed on the trailing edge and the leading edge of the slider 11, only the angle θ1 may fall within a range from not less than 5 degrees to not more than 14 degrees, and the angle θ2 may be out of this range.

Referring to FIG. 3, the first border lines 11a1 and 11b1 of the trailing tapered surface 11a and the leading tapered surface 11b respectively extend in a straight line in the transverse direction of the slider 11. The first border lines 11a1 and 11b1 of the trailing tapered surface 11a and the leading tapered surface 11b may respectively extend in a curved line in the transverse direction of the slider 11.

The protective layer 16 is formed on the surface of the medium-facing surface F of the slider 11 in a hatched portion in FIG. 4. The protective layer 16 is fabricated of the DLC (diamond-like carbon). The protective layer 16 does not extend over the tapered surfaces 11a and 11b. Referring to FIG. 1 through FIG. 3, the protective layer 16 is not shown for purposes of clarity.

The slider 11 shown in FIG. 1 through FIG. 4 has side edges 11c and 11c. The side edges 11c and 11c may be chamfered in a taper or in a curved surface. Furthermore, ridges 11d of the tapered surfaces 11a and 11b respectively with side edges 11c and 11c may be chamfered into a round face R.

The ABS surface 14 shown in FIG. 1 through FIG. 4 may have a mildly curved surface in a so-called crown shape.

The magnetic disk is used in a so-called CSS (contact start/stop) hard disk device or a ramp-load hard disk device.

The present invention is particularly appropriate for use in a ramp-load hard disk device.

FIG. 5 through FIG. 10 are side views and plane views showing the operation of the hard disk device of the ramp-load type.

Figure 6:
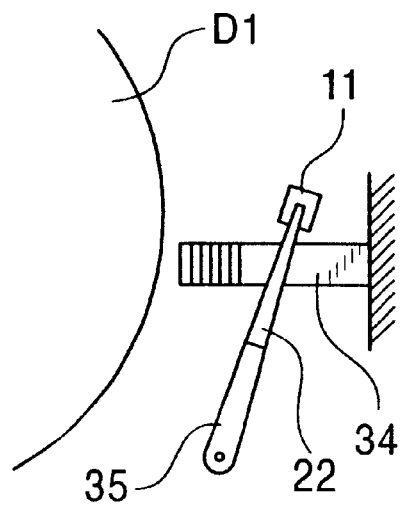
FIG. 6 is a plan view showing the operation of the ramp-load type hard disk.
Figure 7:
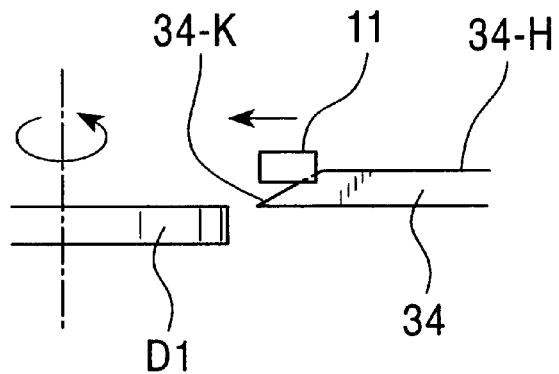
FIG. 7 is a side view showing the operation of the ramp-load type hard disk.
Figure 8:
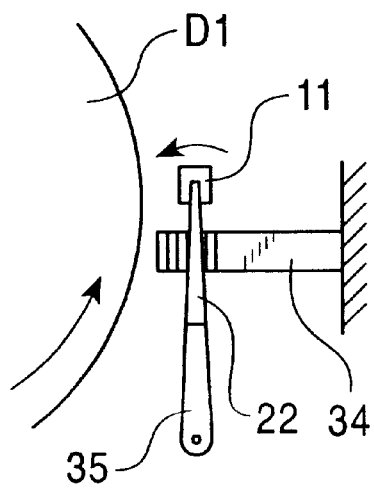
FIG. 8 is a plan view showing the operation of a ramp-load type hard disk.

Referring to FIG. 6, there are shown a slider 11, a load beam 22, a load bar 34, an arm 35 for supporting the load beam 22, and a magnetic disk D1 (a recording medium).

Figure 5:
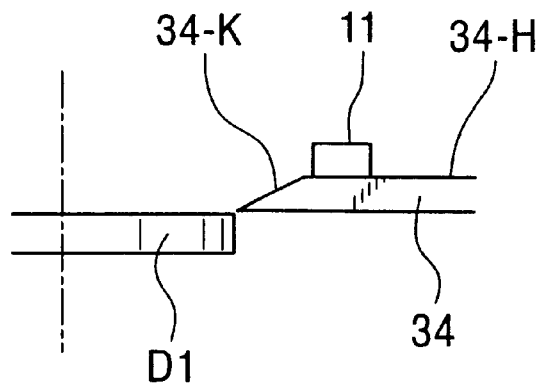
FIG. 5 is a side view showing the operation of a ramp-load type hard disk.

The load bar 34 includes a portion 34-H parallel to the magnetic disk D1 and a portion 34-K inclined with respect to the magnetic disk D1. Referring to FIG. 5 and FIG. 6, the slider 11 and the magnetic disk D1 are out of contact with each other during off operation. The slider 11 remains external to the space of the magnetic disk D1. The motor now starts rotating from that state. When the arm 35 is pivoted about the fulcrum thereof, the load beam 22 slides along the horizontal portion 34-H, and further slides along the taper 34-K (see FIG. 7 and FIG. 8). When the arm 35 further rotates, the load bar 34 that has supported the load beam 22 is unlocked, and the slider 11 moves over the magnetic disk D1 and is lifted (see FIG. 9 and FIG. 10). To unload the slider 11 from the magnetic disk D1, a series of operational steps shown in FIG. 5 through FIG. 10 are performed in reverse order.

Figure 9:
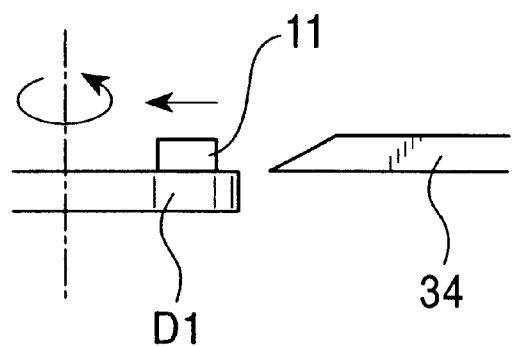
FIG. 9 is a side view showing the operation of the ramp-load type hard disk.
Figure 10:
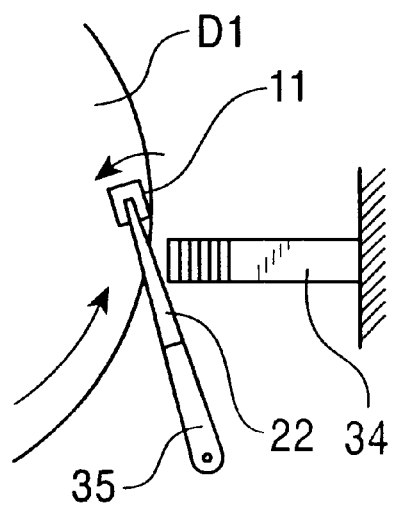
FIG. 10 is a plan view showing the operation of the ramp-load type hard disk.

The ramp-load type slider 11 becomes unstable in the posture thereof when the slider 11 is moved and lifted over the magnetic disk D1 (see FIG. 9 and FIG. 10). The trailing edge and the leading edge of the medium-facing surface of the slider 11 are likely to touch the magnetic disk D1.

In accordance with the present invention, the slider 11 has the tapered surface or the curved surface on the trailing edge and the leading edge of the medium-facing surface thereof. The damage rate of the magnetic disk D1 is reduced when the slider 11 touches the magnetic disk D1

Figure 11:
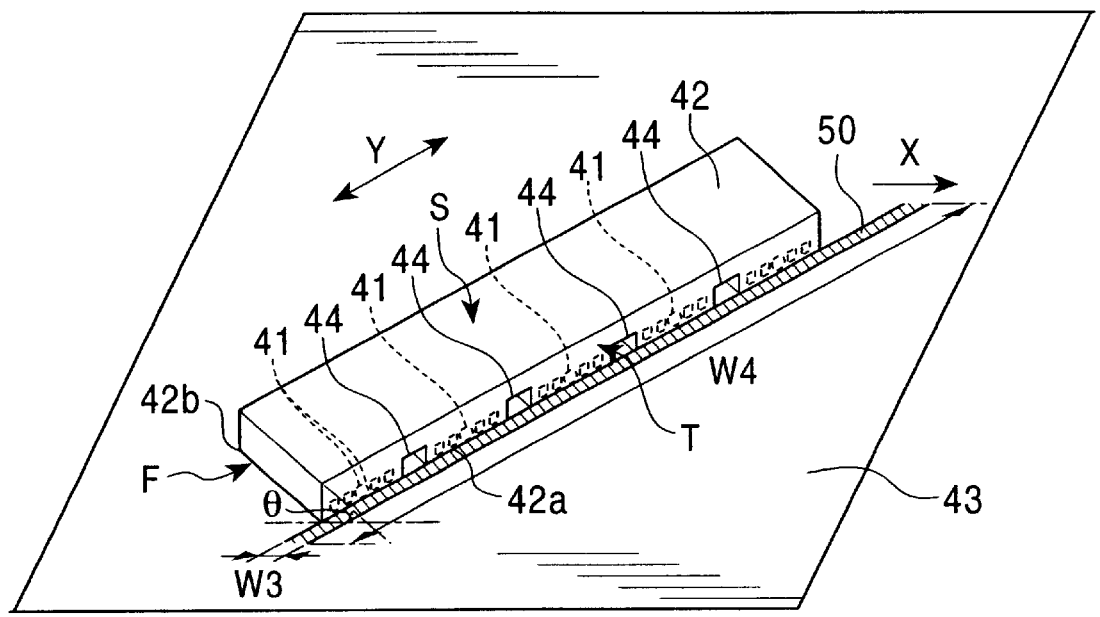
FIG. 11 is a perspective view showing a method for manufacturing the magnetic head of the present invention.

FIG. 11 is a perspective view showing one embodiment of a method for manufacturing a magnetic head of the present invention.

A plurality of elements 41 are formed on a circular substrate fabricated of a ceramic, or alumina-titanium carbide, and the substrate is then cut into a rectangular parallelopiped as a slider bar 42. The plurality of elements 41 are arranged in a line on the trailing end face of the slider bar 42.

Formed on the medium-facing surface F of the slider bar 42 are air grooves and ABS surfaces, the number of which is the same as the number of the elements 41. The surface of the slider bar 42 opposite to the medium-facing surface F serves as a supporting surface.

Referring to FIG. 11, the trailing edge 42a of the medium-facing surface F of the slider bar 42 is placed on a lapping tape 43 as a polishing surface. The slider bar 42 is reciprocatingly moved in a direction parallel to the longitudinal direction of the slider bar 42 (namely, in the Y direction, in other words, in a direction parallel to the trailing end face T) with the angle θ made between the supporting surface S of the slider bar 42 and the surface of the lapping tape 43 set to be not less than 5 degrees but not more than 14 degrees on a jig (not shown). The tapered surface 42a is thus formed on the trailing edge. The slider bar 42 is not pressed against the lapping tape 43 with force, but is placed into contact with the lapping tape 43 with its own gravity. The slider bar 42 may be manually moved in a reciprocating motion.

The leading edge 42b on the medium-facing surface F of the slider bar 42 is placed on the surface of the lapping tape 43. With the angle made between the supporting surface S of the slider bar 42 and the surface of the lapping tape 43 set to be not less than 5 degrees but not more than 14 degrees, the slider bar 42 is reciprocatingly moved in a direction parallel to the longitudinal direction of the slider bar 42 (namely, in the Y direction, in other words, in a direction parallel to the trailing end face T). The tapered surface is formed on the leading edge 42b. This step of producing the tapered surface on the leading edge 42b of the medium-facing surface F of the slider bar 42 may be dispensed with.

A cushioning material may or may not be laid beneath the lapping tape 43.

The slider bar 42 is cut along a notch 44 formed on the medium-facing surface F of the slider bar 42, and individual slider 11 shown in FIG. 1 through FIG. 4 are obtained.

In this embodiment, the flat tapered surfaces are formed on the trailing edge 42a and/or the leading edge 42b of the slider bar 42, controlling variations in the dimensions of the taper such as the angle of the taper and the range of the taper becomes easier.

In the slider 11 shown in FIG. 1 through FIG. 4, variations in the angle θ1 made between the supporting surface S of the slider 11 and the imaginary plane C in which the first border line 11a1 and the second border line 11a2 of the tapered surface 11a lie, and variations in the angle θ2 made between the supporting surface S of the slider 11 and the imaginary plane D in which the first border line 11b1 and the second border line 11b2 of the tapered surface 11b lie, from product to product, are minimized, and the quality of the product is increased.

Variations in the distance L1 from the first border line 11a1 of the tapered surface 11a to the trailing end face T and the distance L3 from the first border line 11b1 of the tapered surface 11b to the leading end face L, from product to product, are minimized, and the quality of the product is increased.

When the slider bar 42 is reciprocatingly moved with the angle made between the supporting surface S of the slider bar 42 and the surface of the lapping tape 43 set to be not less than 5 degrees but not more than 14 degrees, the overall distance of reciprocating motion for forming the tapered surface on the slider bar 42 is reduced. Workability with the slider bar is thus improved. When the slider bar 42 is reciprocatingly moved with the angle made between the supporting surface S of the slider bar 42 and the surface of the lapping tape 43 set to be not less than 5 degrees but not more than 8 degrees, workability with slider bar is even more improved.

When the edges of the slider bar are polished with the angle between the supporting surface S of the slider bar and the surface of the lapping tape set to be an angle of not less than 5 degrees but not more than 14 degrees, an imaginary plane in which the first border line and the second border line of the resulting tapered surface on the trailing edge and/or the leading edge lie makes an angle θ with respect to the supporting surface wherein 5 degrees ≦θ≦14 degrees. In this arrangement, the possibility of damage of the recording medium is lowered when the magnetic head touches the recording medium, and variations in chamfering process are reduced.

When the slider bar 42 is reciprocatingly moved with the angle between the supporting surface S of the slider bar and the surface of the lapping tape 43 set to be not less than 5 degrees but not more than 8 degrees, an imaginary plane in which the first border line and the second border line of the resulting tapered surface at the trailing edge and/or the leading edge lie makes an angle not less than 5 degrees but not more than 8 degrees with respect to the supporting surface. In this arrangement, the recording medium is protected from damage when the magnetic head touches the recording medium.

When the slider bar 42 is reciprocatingly moved in the direction parallel to the longitudinal direction thereof, the first border line 11a1 of the tapered surface 11a formed at the trailing edge of the slider 11 and the first border line 11b1 of the tapered surface 11b formed at the leading edge of the slider 11 extend in a straight line in the transverse direction of the slider 11 as shown in FIG. 3. Controlling variations in machining dimensions of the tapered surfaces 11a and 11b becomes easier.

When the tapered surface 11a is formed, the first border line 11a1 of the tapered surface 11a formed on the trailing edge of the medium-facing surface F is placed closer to the trailing end face T than the gap G of the element 12 as shown in FIG. 3. The gap G is thus prevented from being damaged.

Since the first border line 11b1 of the tapered surface 11b is positioned closer to the leading end face L than the step formed of the ABS surface 14, the lift characteristics of the slider 11 are thus prevented from being affected by the tapered surface 11b.

Figure 12:
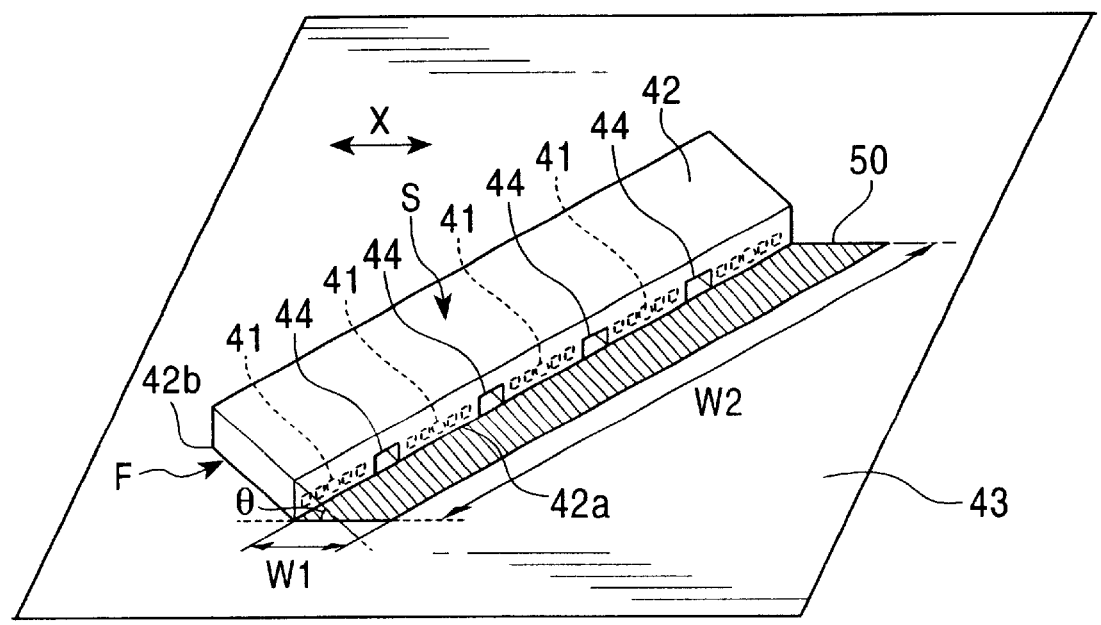
FIG. 12 is a perspective view showing another method for manufacturing the magnetic head of the present invention.
Figure 13:
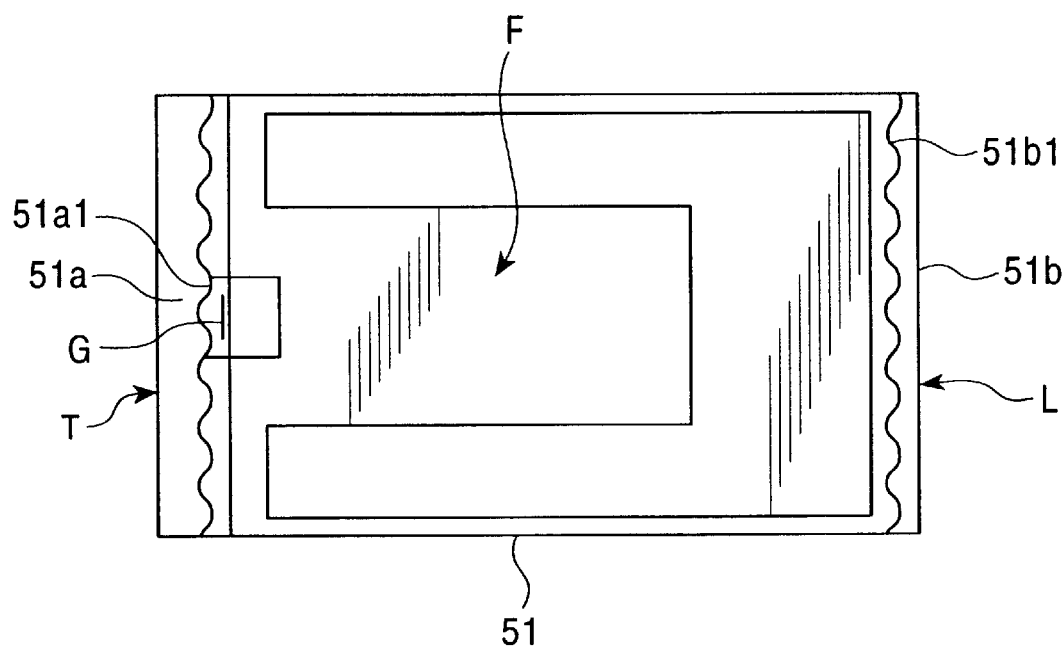
FIG. 13 is a plan view showing a magnetic head in accordance with another embodiment of the present invention.

Referring to FIG. 12, when the tapered surface is formed on each of the trailing edge 42a and the leading edge 42b of the medium-facing surface F of the slider bar 42, each of the trailing edge 42a and the leading edge 42b is placed on the surface of the lapping tape 43 so that the angle θ between the supporting surface S of the slider bar 42 and the surface of the lapping tape 43 is set to be not less than 5 degrees but not more than 14 degrees. The slider bar 42 is then reciprocatingly slid in a direction perpendicular to the longitudinal direction of the slider bar 42 (namely in the X direction or in a direction perpendicular to the trailing end face T of the slider bar 42). The tapered surface is thus formed on each of the trailing edge 42a and the leading edge 42b.

When the slider bar 42 is reciprocatingly slid in a direction perpendicular to the longitudinal direction of the slider bar 42 (namely in the X direction or in a direction perpendicular to the trailing end face T of the slider bar 42) to form the tapered surface on each of the trailing edge 42a and the leading edge 42b, a first border line 51a1 of the tapered surface 51a on the trailing edge of the slider 51 and a first border line 51b1 of a tapered surface 51b on the leading edge of the slider 51 become wavy or ruggedized. The tapered surface 51a and the tapered surface 51b suffer from variations in machining dimensions.

When the slider bar 42 is reciprocatingly slid in a direction perpendicular to the longitudinal direction thereof (in the X direction) to form the tapered surface on each of the trailing edge 42a and the leading edge 42b, the area of the lapping tape 43 required to polish a single edge is W1×W2 as shown in FIG. 12. Here, W1 represents a distance of sliding of the slider bar 42 on the lapping tape 43, and W2 represents the longitudinal length of the slider bar 42.

When the slider bar 42 is reciprocatingly slid in a direction parallel to the longitudinal direction thereof (in the Y direction) to form the tapered surface on each of the trailing edge 42a and the leading edge 42b, the area of the lapping tape 43 required to polish a single edge is W3×W4 as shown in FIG. 11. Here, W3 represents the width of the tapered surface from the first border line to the second border line, and W4 represents the distance of sliding over which the slider bar 42 is slid on the lapping tape 43.

Typically, the relationship of W1×W2>W3×W4 holds. Specifically, the area of the lapping tape 43 required to polish a single edge is larger when using the method of sliding the slider bar 42 in the direction perpendicular to the longitudinal direction of the slider bar 42 (in the X direction) as shown in FIG. 12 than when using the method of sliding the slider bar 42 in the direction parallel to the longitudinal direction of the slider bar 42 (in the Y direction) as shown in FIG. 11.

Once used to form a single tapered surface, that portion (hatched portions shown in FIG. 11 and FIG. 12) of the lapping tape 43 suffers from low polishing performance, and thus cannot be reused. The lapping tape 43 is conveyed in a fine step using a micrometer after the tapered surfaces are formed on the trailing edge 42a and the leading edge 42b of a single slider bar 42. The unused portion of the lapping tape 43 is used to form a tapered surface on another slider bar 42.

Given the lapping tape of equal area, more edges of the sliders are polished when using the method of sliding the slider bar 42 in the direction parallel to the longitudinal direction of the slider bar 42 (in the Y direction) as shown in FIG. 11 than when using the method of sliding the slider bar 42 in the direction perpendicular to the longitudinal direction of the slider bar 42 (in the X direction) as shown in FIG. 12.

The protective layer (not shown in FIG. 11 and FIG. 12) formed of the DLC (diamond-like carbon) is deposited on the medium-facing surface F of the slider bar 42.

Since the entire medium-facing surface F of the slider bar 42 is put into contact with the lapping tape 43 in the conventional chamfering method, the protective layer deposited on the medium-facing surface F is also polished, and the medium-facing surface F is damaged.

Since the trailing edge 42a and/or the leading edge 42b of the slider bar 42 are put into contact with the surface of the lapping tape 43 in this embodiment, the protective layer covering the medium-facing surface F is not polished except for the trailing edge 42a and the leading edge 42b. As shown in FIG. 4, the finished slider has the medium-facing surface F almost entirely covered with the protective layer 16. The medium-facing surface F is thus protected from damage.

EXAMPLE

A plurality of sliders as shown in FIG. 1 through FIG. 4 were produced, which were different in the angle θ1 made between the supporting surface S of the slider 11 and the imaginary plane C in which the first border line 11a1 and the second border line 11a2 of the tapered surface 11a lay, and in the angle θ2 made between the supporting surface S of the slider 11 and the imaginary plane D in which the first border line 11b1 and the second border line 11b2 of the tapered surface 11b lay. Here, θ1 and θ2 are respectively blending angles of the tapered surfaces 11a and 11b. In this example, θ1=θ2=θ.

The distance L1 from the first border line 11a1 of the tapered surface 11a was 20 μm, and the distance L2 from the first border line 11a1 to the gap G was 5 μm.

As shown in FIG. 2 and FIG. 6, each of the plurality of sliders was connected to the arm 35 through the flexure 23 and the load beam 22, and a ramp-load type hard disk device resulted. The hard disk was subjected to a start and stop test to examine a rate of damage occurrence of the magnetic disk D1 (the recording medium).

Figure 14:
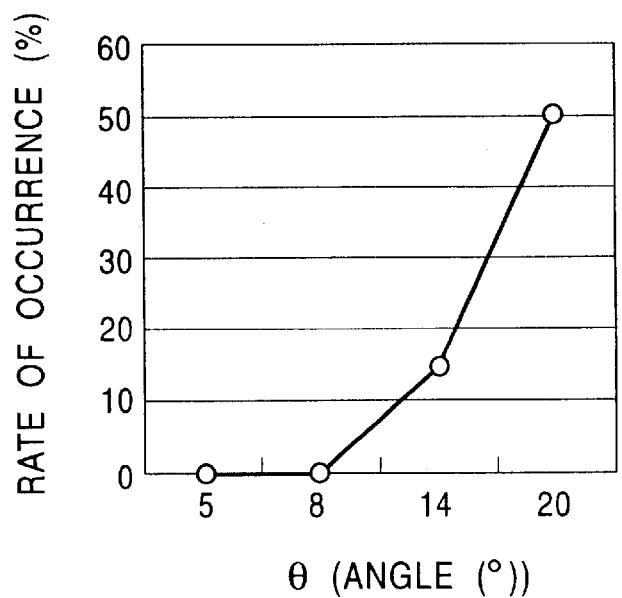
FIG. 14 is a graph plotting the relationship between the blending angle of a slider and a rate of occurrences of magnetic disk damage.

FIG. 14 is a graph plotting the relationship between the blending angles θ(=θ1=θ2) of the tapered surfaces 11a and 11b and the rate of damage occurrences of the magnetic disk D1.

As seen from FIG. 14, the rate of damage occurrence of the magnetic disk falls below 15% within a range of θ≦14 degrees, and is zero within a range of 5 degrees ≦θ≦8 degrees. The damage rate of the magnetic disk increases, with the ease with which each of the trailing edge and the leading edge of the medium-facing surface F of the slider 11 touches the magnetic disk D1. The rate of damage of the magnetic disk is reduced or the magnetic disk is prevented from being damaged by forming the tapered surface at an appropriate blending angle on each of the trailing edge and leading edge of the medium-facing surface F.

If each of the angles θ1 and θ2 is more than 14 degrees, the edge angle of the slider at the first border line 11a1 of the tapered surface 11a, and the edge angle of the slider at the first border line 11b1 of the tapered surface 11b become closer to a right angle. The damage rate of the magnetic disk D1 cannot be reduced when the slider 11 comes into contact with the magnetic disk D1.

A plurality of sliders having different blending angles θ(=θ1) of the tapered surface 11a were produced, and variations (standard deviation σ) in the distance L from the first border line 11a1 of the tapered surface 11a to the trailing end face T were measured. The target of the distance L1 from the first border line 11a1 of the tapered surface 11a to the trailing end face T was set to be 20 μm, and the target of the distance L2 from the first border line 11a1 to the gap G was set to be 5 μm.

Figure 15:
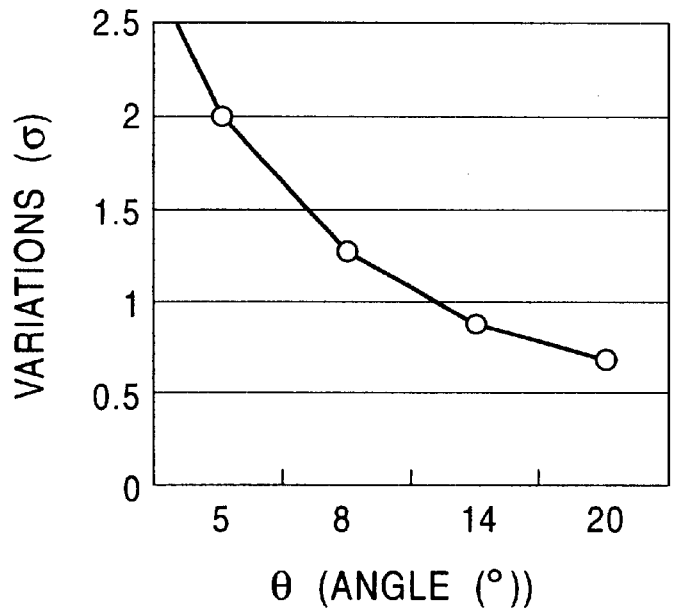
FIG. 15 is a graph plotting the relationship between the blending angle of the slider and variations in distance between a first border line of a tapered surface and a trailing end face (standard deviation σ)

FIG. 15 shows the test results. As seen from FIG. 15, with the range of the angle θ<5 degrees, the variations (standard deviation σ) in the distance L1 from the first border line 11a1 of the tapered surface 11a to the trailing end face T exceed 2 μm. Specifically, 3σ>6 μm, and when the target of the distance L2 from the first border line 11a1 to the gap G is 5 μm as discussed above, the position of the first border line 11a1 is varied and exceeds the position of the gap G with a significant probability (approximately 5% or more). If the position of the first border line 11a1 of the slider 11 exceeds the position of the gap G, the gap G is also polished during the formation of the tapered surface 11a. The performance of the element 12 is thus degraded. It is therefore a requirement that the angle θ be not less than 5 degrees.

A plurality of sliders having different blending angles θ(=θ2) of the tapered surface 11b were produced, and variations (standard deviation σ) in the distance L3 from the first border line 11b1 of the tapered surface 11b to the leading end face L were measured. The results are similar to the ones shown in FIG. 15.

The relationship between the blending angle θ (=θ1) of the tapered surface 11a and the workability of the tapered surface 11a was examined. The workability in the formation of the tapered surface 11a is represented by an overall distance of sliding La over which the slider bar has been reciprocatingly moved over the lapping tape to form the tapered surface 11a having the blending angle of θ (=θ1).

The tapered surface 11a was formed by reciprocatingly sliding the slider bar 42 in a direction parallel to the longitudinal direction of the slider bar 42 (in the Y direction) as shown in FIG. 11. The slider bar 42, which was pressed onto the lapping tape 43 with the gravity of its own, was manually slid.

The overall distance of sliding La is La=2×W4×N, where W4 represents a distance over which the slider bar 42 is moved on the lapping tape 43, and N represents the number of reciprocating motions.

Figure 16:
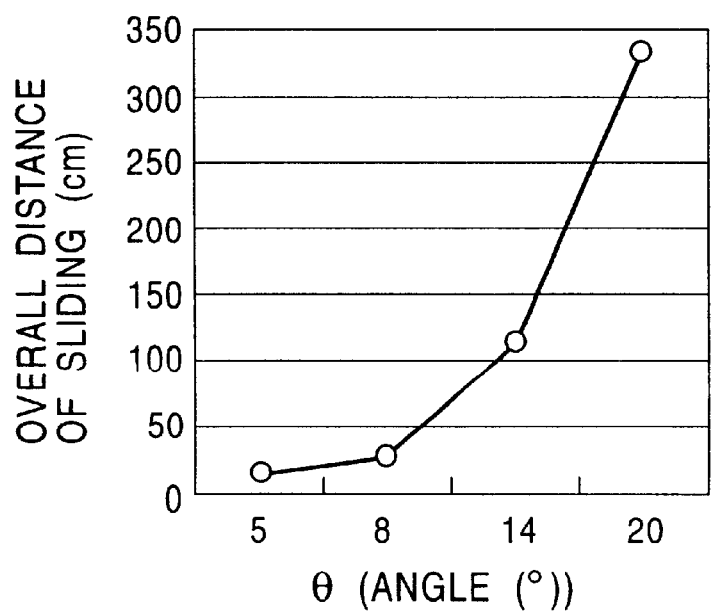
FIG. 16 is a graph plotting the blending angle of the slider and an overall distance of sliding of the slider bar.
Figure 17:
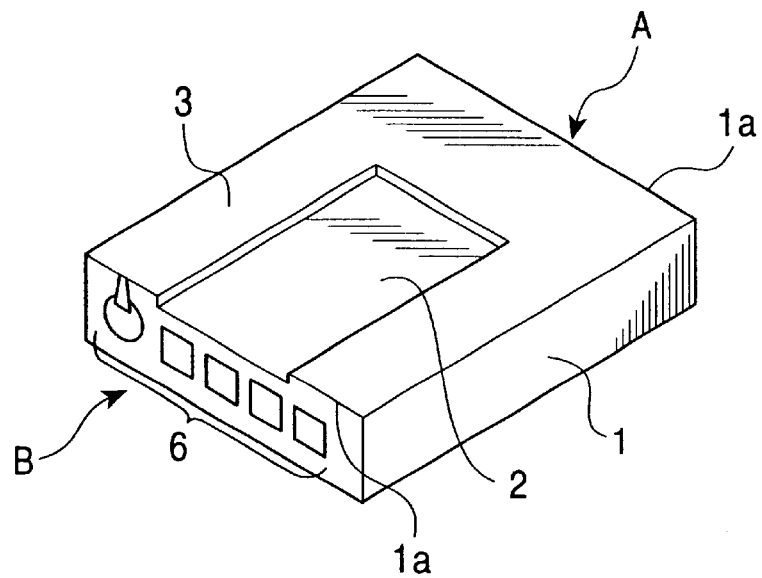
FIG. 17 is a perspective view showing a conventional magnetic head.
Figure 18:
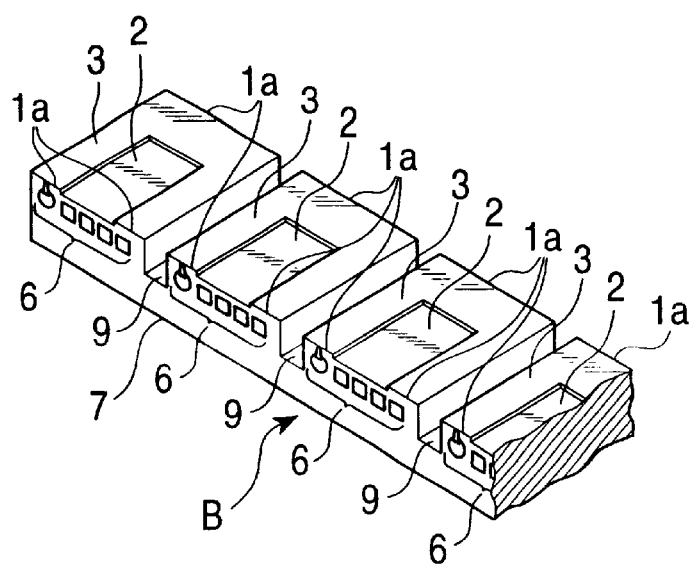
FIG. 18 is a perspective view showing a slider bar from which the magnetic head of FIG. 17 is produced.
Figure 19:
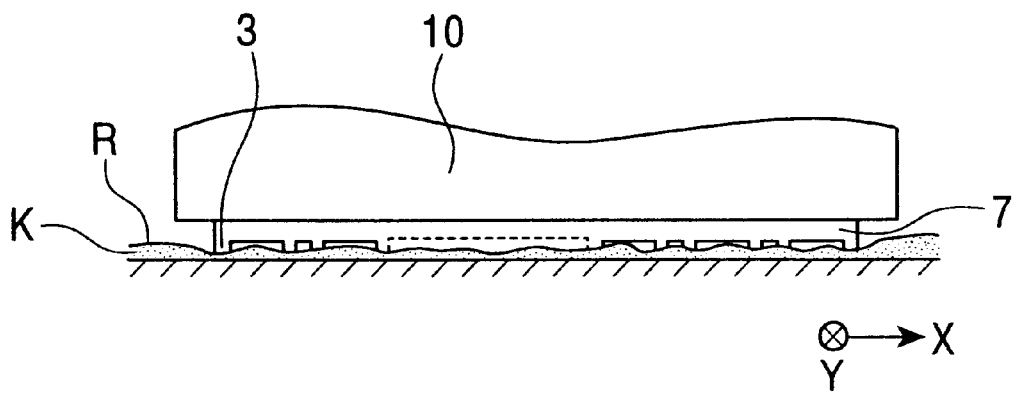
FIG. 19 is a front view showing a chamfering process of the conventional magnetic head.

FIG. 16 is a graph plotting the relationship between the blending angle θ (=θ1) of the tapered surface 11a and the overall distance of sliding La required to form the tapered surface 11a.

As seen from FIG. 16, the overall distance of sliding La sharply increases with the blending angle θ exceeding 14 degrees, thereby significantly degrading workability. With the blending angle θ falling within a range of 5 degrees $\leq \theta \leq 8$ degrees, the overall distance of sliding La drops below 30 cm, and an excellent workability results.

The relationship between the blending angle θ (=θ2) of the tapered surface 11b and the workability of the tapered surface 11b was also examined. The results are similar to the ones shown in FIG. 16.

As seen from FIG. 14 through FIG. 16, the blending angles θ1 and θ2 fall within the range of 5 degrees <θ1, θ2 $\leq$ 14 degrees, and more preferably within the range of 5 degrees $\leq$ θ1, θ2 $\leq$ 8 degrees, wherein the angle θ1 is made between the supporting surface S of the slider 11 and the imaginary plane C in which the first border line 11a1 and the second border line 11a2 of the tapered surface 11a lie, and the angle θ2 is made between the supporting surface S of the slider 11 and the imaginary plane D in which the first border line 11b1 and the second border line 11b2 of the tapered surface 11b lie.

In accordance with the present invention, the tapered surface or the curved surface is formed on the trailing edge and/or the leading edge of the medium-facing surface, and the imaginary plane in which the first border line and the second border line lie makes an angle of not less than 5 degrees but not more than 14 degrees with respect to the supporting surface. The rate of damage of the recording medium is lowered when the magnetic head comes into contact with the recording medium. In this arrangement, variations in the machining dimensions are reduced.

In accordance with the present invention, the imaginary plane in which the first border line and the second border line lie makes an angle of not less than 5 degrees but not more than 8 degrees with respect to the supporting surface.

The recording medium is prevented from being damaged when the magnetic head comes into contact with the recording medium.

What is claimed is:

1. A magnetic head comprising a slider including a medium-facing surface oriented toward a recording medium, a supporting surface serving as a support, a trailing end face and a leading end face, and an element, arranged on the trailing end face of the slider, for magnetically recording and/or magnetically reproducing data, wherein at least one of the trailing edge and the leading edge of the medium-facing surface has a tapered surface or a curved surface having a first border line bordering the medium-facing surface and a second border line bordering one of the trailing end face and the leading end face, and wherein an imaginary plane in which the first border line and the second border line lie makes an angle of not less than 5 degrees to not more than 14 degrees with respect to the supporting surface.

2. A magnetic head according to claim 1, wherein a protective layer is formed on the medium-facing surface.

3. A magnetic head according to claim 1, wherein the first border line of the tapered surface or the curved surface formed on the trailing edge is positioned to be closer to the trailing end face than a gap of the element.

4. A magnetic head according to claim 1, wherein the medium-facing surface includes a step, and the highest surface area of the medium-facing surface is an ABS surface receiving a lift from an air flow on the recording medium, and the gap of the element is located within the region of the ABS surface.

5. A magnetic head according to claim 4, wherein the first border line runs along a border between one of the tapered surface and the curved surface and the ABS surface.

6. A magnetic head according to claim 4, wherein the first border line of the tapered surface or the curved surface formed on the leading edge is positioned to be closer to the leading end face than a step defining the ABS surface.

7. A magnetic head according to claim 1, wherein the first border line extends in a straight line or a curved line in the transverse direction of the slider.

* * * * *